United States Patent
Tabuchi et al.

(10) Patent No.: US 6,813,415 B2
(45) Date of Patent: Nov. 2, 2004

(54) WAVELENGTH MULTIPLEXING/ DEMULTIPLEXING APPARATUS

(75) Inventors: Haruhiko Tabuchi, Kawasaki (JP); Terukazu Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 10/353,004

(22) Filed: Jan. 29, 2003

(65) Prior Publication Data

US 2003/0228105 A1 Dec. 11, 2003

(30) Foreign Application Priority Data

Jun. 7, 2002 (JP) .................................. 2002-167067

(51) Int. Cl.⁷ .............................................. G02B 6/34
(52) U.S. Cl. ........................... 385/37; 385/46; 385/24
(58) Field of Search .......................... 385/14, 15, 24, 385/37, 39, 46

(56) References Cited

U.S. PATENT DOCUMENTS 5,862,279 A * 1/1999 Amersfoort et al. ...... 385/24 X
6,317,534 B1 * 11/2001 Miyazaki et al. ............. 385/24

FOREIGN PATENT DOCUMENTS

| JP | 11-2733 | 1/1999 |
| JP | 11-218624 | 8/1999 |
| JP | 2002-131541 | 5/2000 |

* cited by examiner

*Primary Examiner*—Phan T. H. Palmer
(74) *Attorney, Agent, or Firm*—Staas & Halsey LLP

(57) ABSTRACT

The present invention aims at providing a wavelength multiplexing/demultiplexing apparatus for reducing a loss at a portion where an input slab and channel waveguides are connected with each other, thereby capable of realizing the reduction of loss in the overall apparatus. In order to achieve the above object, in this wavelength multiplexing/ demultiplexing apparatus comprising an input waveguide, an input slab, channel waveguides, an output slab and output waveguides that are formed on a substrate, a curvature radius (r1) of an output side circular arc interface of the input slab is smaller than a curvature radius (r2) of an input side circular arc interface of the output slab, and spacing (P1) between the channel waveguides at a portion where the input slab and each of the channel waveguides are connected with each other is smaller than spacing (P2) between the channel waveguides at a portion where each of the channel waveguides and the output slab are connected with each other.

7 Claims, 10 Drawing Sheets

FIG.2 RELATED ART
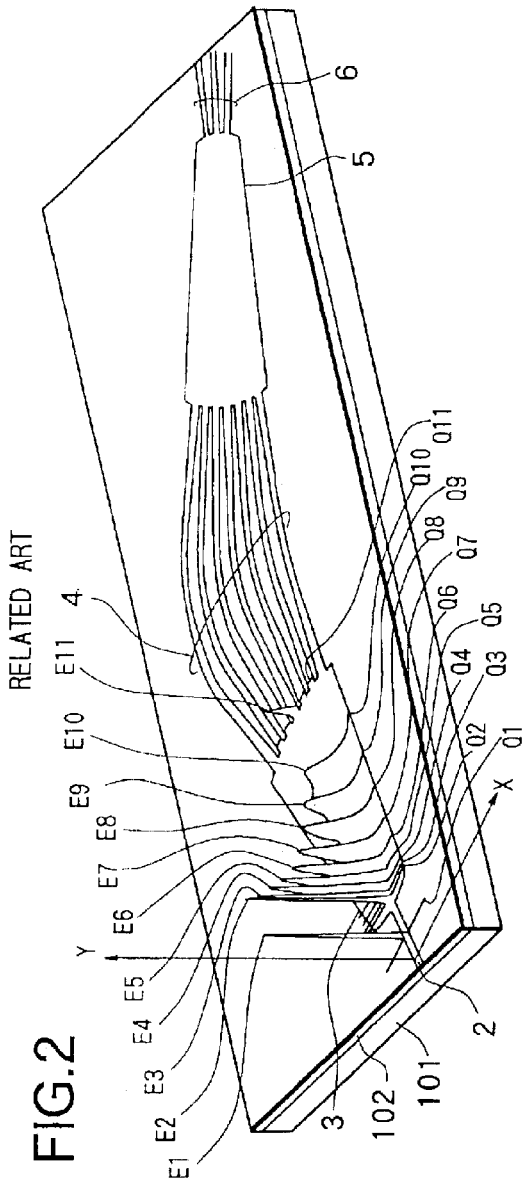
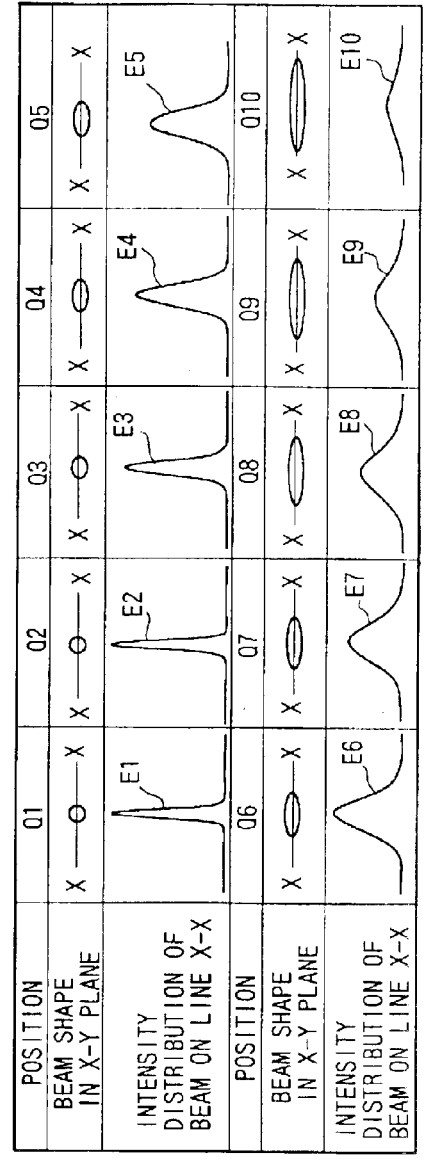

FIG.5
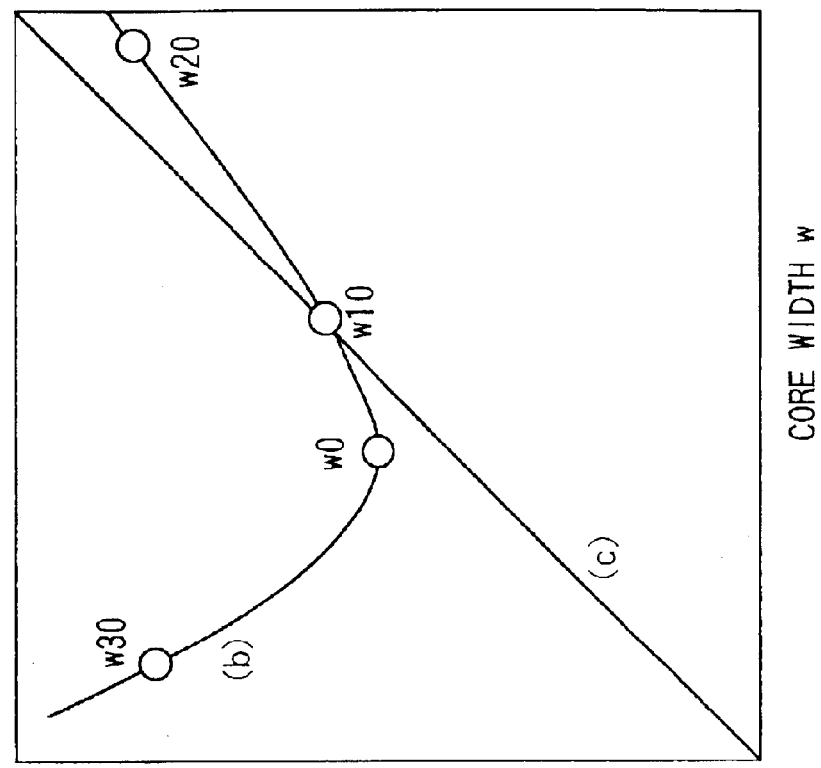
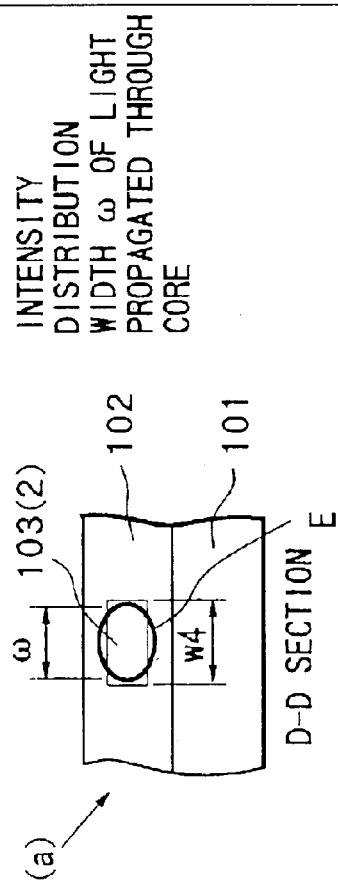

WAVELENGTH MULTIPLEXING/DEMULTIPLEXING APPARATUS

BACKGROUND OF THE INVENTION

1. Field of the Invention

The present invention relates to a wavelength multiplexing/demultiplexing apparatus that is used in wavelength division multiplexing (WDM) communications for multiplexing a plurality of light with different wavelengths to demultiplex, for each wavelength, the multiplexed light that has been transmitted through a single optical fiber, or for multiplexing a plurality of light with different wavelengths to input the multiplexed light to a single optical fiber, and in particular, relates to a technique for reducing a loss in the wavelength multiplexing/demultiplexing apparatus using an optical waveguide of a substrate shape that is formed by enclosing, by a cladding, a core having a refractive index higher than that of the cladding.

2. Description of the Related Art

A configuration example of a wavelength multiplexing/demultiplexing apparatus using a conventional optical waveguide is shown in FIG. 10, in which (a) is a plan view, and (b), (c) and (d) are cross sectional views taken along lines A—A, B—B and D—D in the plan view, respectively.

As illustrated in (b) of FIG. 10, the optical waveguide in the conventional wavelength multiplexing/demultiplexing apparatus comprises a cladding 102 and a core 103 respectively formed on a substrate 101. The core 103 has a refractive index higher than that of the cladding 102 and is enclosed by the cladding 102.

Patterns 2–6 shown in (a) of FIG. 10 are formed by core patterns, wherein 2 is an input waveguide, 3 is an input slab, 4 are channel waveguides, 5 is an output slab and 6 are output waveguides. Here, a connection point between the input waveguide 2 and the input slab 3 is denoted by 301, an interface between the input slab 3 and the channel waveguides 4 is denoted by 302, an interface between the channel waveguides 4 and the output slab 5 is denoted by 502, and an interface between the output slab 5 and the output waveguides 6 is denoted by 504. Further, in (b) of FIG. 10, thickness and width of the core 103 constituting the input waveguide 2 are denoted by t and w2, respectively. Still further, in (d) of FIG. 10, spacing between each core 103 constituting each of the channel waveguides 4 at the interface 302 is denoted by P1, and width of each core 103 is denoted by w4. In addition, in (a) of FIG. 10, spacing between each core 103 constituting each of the channel waveguides 4 at the interface 502 is denoted by P2. Note, each core 103 has the same thickness t at all positions in the input waveguide 2, the input slab 3, the channel waveguides 4, the output slab 5 and the output waveguides 6. Further, it is assumed that the channel waveguides 4 are configured so as to be gradually longer from the lower side to the upper side in (a) of FIG. 10, and the length of each channel waveguides 4 is adjusted so that a difference between optical path from the input slab 3 and the output slab 5 in the adjacent core patterns is maintained to be fixed The conventional wavelength multiplexing/demultiplexing apparatus is designed so that the interface 302 between the input slab 3 and the channel waveguides 4 is a circular arc interface centered at the point 301 with a curvature radius r1, the interface 502 between the channel waveguides 4 and the output slab 5 is a circular arc interface centered at a point 501 with a curvature radius r2, and the curvature radiuses of r1 and r2 of respective circular arc interfaces are equal to each other. Further, it is typical that the spacing P1 between the cores comprising the channel waveguides 4 at the input slab 3 side is equal to the spacing P2 between the cores comprising the channel waveguides 4 at the output slab 5 side.

In such a conventional wavelength multiplexing/demultiplexing apparatus, if each light with each wavelength $\lambda1$, $\lambda2$ and $\lambda3$ is multiplexed to be input to the input waveguide 2, for example, the multiplexed light is demultiplexed for each wavelength $\lambda1$, $\lambda2$ and $\lambda3$ to be output from each of the output waveguides 6. Conversely, if each light with each wavelength $\lambda1$, $\lambda2$ and $\lambda3$ is input to each of the output waveguides 6, each light with each wavelength $\lambda1$, $\lambda2$ and $\lambda3$ is multiplexed to be output from the input waveguide 2.

Incidentally, in the wavelength multiplexing/demultiplexing apparatus constituted as described above, as shown in (c) of FIG. 10, gaps G exist in a position where each of the channel waveguides 4 is connected to the input slab 3. Each of the gaps G is a factor responsible for a loss of light that is incident on the input waveguide 2 and propagated through the input slab 3 to be coupled to each of the channel waveguides 4. Therefore, it is preferable that each gap G is as narrower as possible.

On the other hand, in the channel waveguides 4, since it is necessary to define a phase difference between the light passing through each waveguide, it is required that interference between the waveguides does not occur. For this purpose, the channel waveguides 4 need to be formed so as to maintain spacing constant or above therebetween except at connection points with the input slab 3. Conventionally, by maintaining the spacing P1 constant between the channel waveguides at the connection points with the input slab 3, the spacing of the channel waveguides at other portions is also maintained constant.

As one of methods of reducing the gaps G while maintaining the spacing P1 constant or above, there is known a method of forming tapered portions 401 on the portion where the input slab 3 and the channel waveguides 4 are connected with each other, as shown in (a) of FIG. 10. In this way, in the conventional wavelength multiplexing/demultiplexing apparatus, the gaps G are made narrower to reduce a connection loss between the input slab 3 and the channel waveguides 4. Note, in the configuration example in (a) of FIG. 10, tapered portions 402 are also formed on the point where the channel waveguides 4 and the output slab 5 are connected with each other.

In the conventional wavelength multiplexing/demultiplexing apparatus as described above, if a waveguide with a core having the thickness t in 7 $\mu$m is used, for example, it is required that the core spacing P1 between the channel waveguides 4 at the input slab 3 side is about 18 $\mu$m or more. At this time, in order to reduce the loss, the gaps G between the channel waveguides 4 may be as narrower as possible. However, due to the width of photomasking for processing and overetching in a transverse direction at the time of processing, it becomes difficult to form the gaps G into about 3 $\mu$m or less according to the known technique described above. As a result, there is a problem in that, even in the case where the tapered portions 401 are formed, the loss of 1 dB or more causes at the portion where the input slab 3 and the channel waveguides 4 are connected with each other.

There are known techniques for reducing the loss in the conventional wavelength multiplexing/demultiplexing apparatus disclosed in Japanese Patent No. 2861996 and Japanese Unexamined Patent Application No. 2000-131541. Such known techniques are for reducing the loss at the connection points between the output slab and the output waveguides by performing mode matching at the connection points between the output slab and the output waveguides. Further, more typically, these techniques are for reducing connection loss at the portion where the input slab and the input waveguide are connected with each other or the portion where the output slab and the output waveguides are connected with each other. However, the known techniques described above do not refer to the mode matching at the connection points between the input slab and the channel waveguides as described above, and thus the problem about the loss reduction at such a portion has not yet been solved.

SUMMARY OF THE INVENTION

The present invention has been accomplished in view of the above problem, and it is an object of the present invention to provide a wavelength multiplexing/demultiplexing apparatus that reduces a loss at a connection portion where an input slab and channel waveguides are connected with each other, to thereby enable to realize reduction of loss in the overall apparatus.

In order to achieve the above object, according to the present invention, there is provided a wavelength multiplexing/demultiplexing apparatus comprising on a substrate: at least one input waveguide that is input with an optical signal at one end thereof; an input slab that is connected with the other end of the input waveguide at an input side interface thereof, and propagates freely the optical signal from the input waveguide in a plane direction of the substrate to an output side circular arc interface thereof; a plurality of channel waveguides that are connected to the output side circular arc interface of the input slab at one ends thereof, and have waveguide lengths different from each other; an output slab that is connected with the other end of each of the channel waveguides at an input side circular arc interface thereof and propagates freely the optical signal from each of the channel waveguides in the plane direction of the substrate to an output side interface thereof; and a plurality of output waveguides that are connected to the output side interface of the output slab at one ends thereof. This wavelength multiplexing/demultiplexing apparatus is characterized in that a curvature radius of the output side circular arc interface of the input slab is smaller than a curvature radius of the input side circular arc interface of the output slab, and further, spacing between the channel waveguides at a portion where the input slab and the channel waveguides are connected with each other is narrower than spacing between the channel waveguides at a portion where the channel waveguides and the output slab are connected with each other.

In the wavelength multiplexing/demultiplexing apparatus with such a constitution, WDM light input to the input waveguide, for example, is propagated through the input waveguide to be sent to the input slab, and is propagated freely in the input slab in a plane direction of the substrate to be extended, and then this extended WDM light is guided from the output side circular arc interface to the plurality of channel waveguides. The WDM light propagated through the channel waveguides, in which a phase difference occurs depending on a difference between the optical path lengths of the channel waveguides, reaches the input side circular arc interface of the output slab to be propagated freely in the output slab in the plane direction of the substrate. At this time, since the phase difference in the channel waveguides is different depending on the wavelengths, each optical signal of the WDM light is condensed at different points depending on the wavelengths. Then, optical signals of the respective wavelengths are propagated separately through corresponding output waveguides to be emitted from each of the output waveguides.

In the propagation process of the optical signals as described above, since the curvature radius of the circular arc interface of the input slab is set to be smaller than the curvature radius of the circular arc interface of the output slab, and further, the spacing between the channel waveguides at the portion where the input slab and the channel waveguides are connected with each other is set to be narrower than the spacing between the channel waveguides at the portion where the channel waveguides and the output slab are connected with each other, an area where each intensity distribution of light (electric field) excited by the adjacent channel waveguides, at the connection portion to the input slab, is overlapped with each other is increased, and therefore, the loss can be reduced when the light having been propagated freely in the input slab is optically coupled to each of the channel waveguides.

Further, in the wavelength multiplexing/demultiplexing apparatus described above, each channel waveguide may comprise, in the vicinity of the connection portion to the input slab, a tapered portion formed so that the width of the waveguide becomes narrower in the direction of the input slab. According to such a constitution, since the width of the intensity distribution of the excited light is further extended with respect to the width of each channel waveguide at the connection portion to the input slab, the area where each light intensity distribution of the adjacent channel waveguides is overlapped with each other is further increased so that the loss can be further reduced at the portion where the input slab and the channel waveguides are connected with each other.

Still further, each channel waveguides described above may further comprise a constant-width portion that has the constant width equal to the narrowest width of the waveguide in the tapered portion and the tapered portion may be connected to the input slab via the constant-width portion. Thus, it becomes possible to reduce the length of the tapered portion, thus enabling to miniature the size of the apparatus.

The other objects, features and advantages of the present invention will be apparent from the following description of the embodiments with reference to the accompanying drawings.

BRIEF DESCRIPTION OF THE DRAWINGS

FIG. 2 are diagrams illustrating light intensity distribution of light that is propagated through an input waveguide and an input slab in a conventional wavelength multiplexing/demultiplexing apparatus, in which (a) shows changes in the light intensity distribution corresponding to the wavelength multiplexing/demultiplexing apparatus, and (b) shows shapes of the light intensity distribution at each position in (a);

FIG. 5 is a diagram showing a relationship of the intensity distribution of the light propagated through a core, to core width of each channel waveguide in the first embodiment;

DETAILED DESCRIPTION OF THE INVENTION

Hereinafter, embodiments of the present invention will be described with reference to drawings.

Figure 1:
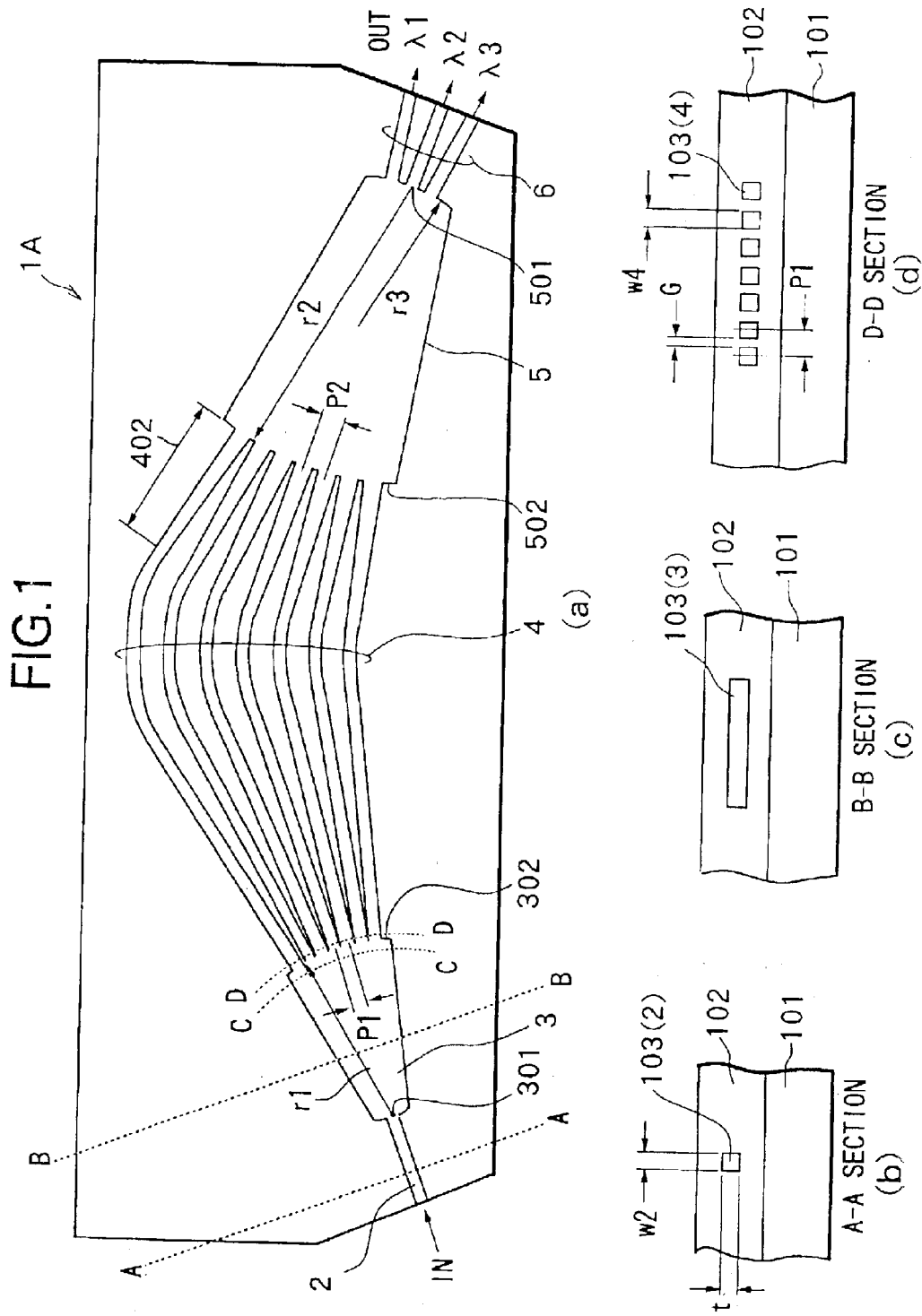
FIG. 1 are diagrams showing a constitution of a wavelength multiplexing/demultiplexing apparatus according to a first embodiment of the present invention, in which (a) is a plan view, and (b), (c) and (d) are cross sectional views taken along lines A—A, B—B and D—D in the plan view, respectively.

FIG. 1 shows a constitution of a wavelength multiplexing/demultiplexing apparatus according to a first embodiment of the present invention, in which (a) is a plan view, and (b), (c) and (d) are cross sectional views taken along lines A—A, B—B and D—D in the plan view, respectively.

Figure 10:
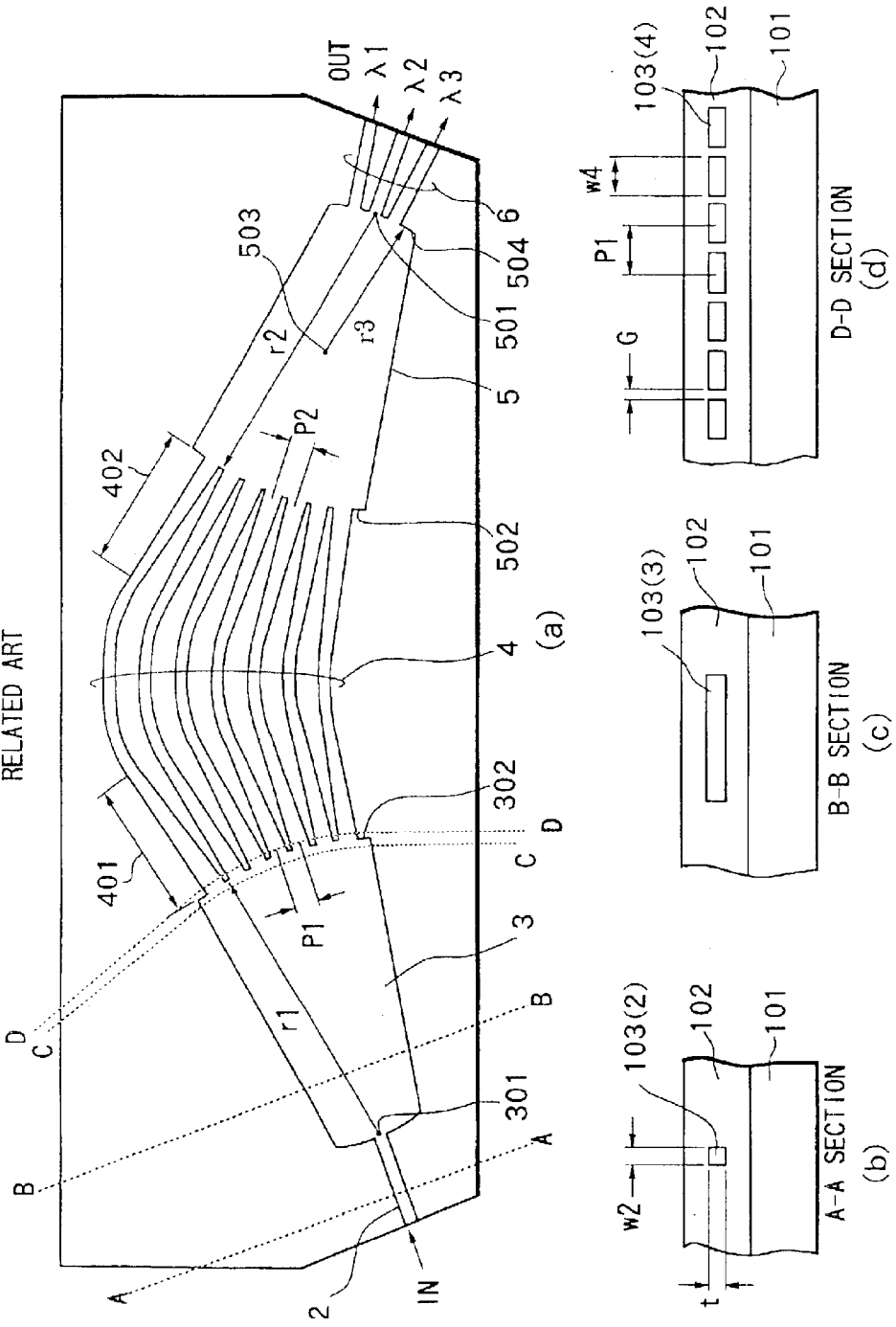
FIG. 10 are diagrams showing a constitution of a wavelength multiplexing/demultiplexing apparatus using a conventional optical waveguide, in which (a) is a plan view, and (b), (c) and (d) are cross sectional views taken along lines A—A, B—B and D—D in the plan view, respectively.

In (a) to (d) of FIG. 1, just as in the conventional constitution shown in FIG. 10 above, for example, the present wavelength multiplexing/demultiplexing apparatus 1A includes an optical waveguide comprising a cladding 102 and a core 103 formed on an substrate 101, and each core pattern of the optical waveguide consists of an input waveguide 2, an input slab 3, channel waveguides 4, an output slab 5 and output waveguides 6. This wavelength multiplexing/demultiplexing apparatus 1A is characterized in that a curvature radius r1 of a circular arc interface 302 positioned at a portion where the input slab 3 and the channel waveguides 4 are connected with each other is set to be smaller than a curvature radius r2 of a circular arc interface positioned at a portion where the channel waveguides 4 and the output slab 5 are connected with each other, and further, spacing P1 between each core constituting each channel waveguide 4 at the circular arc interface 302 on the input slab 2 side is set to be narrower than spacing P2 between each core constituting the channel waveguides 4 at the circular arc interface 502 on the output slab 5 side Note, the circular arc interface 302 of the input slab 3 is positioned on a circular arc with radius r1 centered at a point 301 where the input waveguide 2 and the input slab 3 are connected with each other, and the circular arc interface 502 of the output slab 5 is positioned on a circular arc with radius r2 centered at a point 501 where the output slab 5 and the output waveguides 6 are connected with each other.

For the substrate 101, a silicon substrate or the like is used, for example. On the substrate 101, the cladding 102 and the core 103 that are consisted of glass and the like are formed. The core 103 has a higher refractive index than that of the cladding 102 and is circumferentially enclosed by the cladding 102. As an example of specific constitutions, it is assumed here that a relative refractive index difference between the core 103 and the cladding 102 is 0.5%, and the thickness t of the core 103 is 7 $\mu$m.

Note, it is assumed that the thickness t of the core 103 is constant across all area, and the core width is 7 $\mu$m in the input waveguide 2, the output waveguides 6, and the channel waveguides 4 except the tapered portions 402. Further, although the example in which one input waveguide 2 is connected with the input slab 3, the input slab 3 may be connected with a plurality of input waveguides 2.

The input slab 3 is a pattern extended in a plane direction of the substrate so as to freely propagate light incident form the input waveguide 2 in the plane direction. Here, the radius r1 of the circular arc interface 302 at the connection portion to the channel waveguides 4 is assumed to be 20 mm, for example.

The plurality of channel waveguides 4 are arrayed optical waveguides constituted so as to separate the light extended in the input slab 3 into a plurality of light fluxes and then form a phase difference between the light fluxes. The respective channel waveguides 4 are designed so that each one end thereof is connected to the circular arc interface 302 of the input slab 3, and lengths thereof are different from each other and an optical path difference between adjacent core patterns is constant. Here, as an example of specific designing values, it is assumed that the spacing (pitch) P1 is 10 $\mu$m and a gap G is 3 $\mu$m between the cores 103 of the channel waveguides 4 that are connected with the input slab 3. Further, it is assumed that the spacing (pitch) P2 is 20 $\mu$m and the gap G is 3 $\mu$m between the cores 103 of the channel waveguides 4 that are connected with the output slab 5. Note, in this embodiment, it is assumed that the channel waveguides 4 are connected with the input slab 3 without provided with tapered portions on the input side thereof, and, on the other hand, the channel waveguides 4 are connected with the output slab 5 with provided with tapered portions 402 on the output side thereof.

The output slab 5 is a pattern that is extended in the plane direction of the substrate so as to freely propagate the light having passed through the channel waveguides 4. Here, the radius r2 of the circular arc interface 502 at the connection portion to the channel waveguides 4 is assumed to be 40 mm, for example. Further, in the output slab 5, a circular arc interface 504 corresponding to a Rowland circle of the circular arc interface 502 with the radius r2 is formed so as to face the interface 502, and the plurality of output waveguides 6 are connected to the interface 504.

Note, the input slab 3 and the output slab 5 described above are preferably designed to be analogous to each other. Further, the channel waveguides are preferably designed so that a ratio between the core spacing P1 and P2 at the input slab 3 side and at the output side 5 side, is equal to a ratio between the radii r1 and r2 of the input slab 3 and the output slab 5. If the input slab 3 and the output slab 5 are analogous to each other, the core patterns of this wavelength multiplexing/demultiplexing apparatus 1A can be drawn only by reducing the radius r1 of the input slab 3 and also extending linear portions of the channel waveguides 4 to be connected to the input slab 3, in the conventional wavelength multiplexing/demultiplexing apparatus shown in FIG. 10, thus it becomes possible to readily design the wavelength multiplexing/demultiplexing apparatus 1A.

Next, an operation of the wavelength multiplexing/demultiplexing apparatus 1A according to the first embodiment will be described.

First, basic propagation of light within the input waveguide 2, the input slab 3 and the channel waveguides 4 will be described.

FIG. 2 are diagrams illustrating light intensity distribution of light (electric field) propagated through the input waveguide 2 and the input slab 3 in the conventional wavelength multiplexing/demultiplexing apparatus shown in FIG. 10 above. Note, (a) of FIG. 2 shows a change in the light intensity distribution corresponding to the wavelength multiplexing/demultiplexing apparatus, in which Q1 to Q11 represent positions and E1 to E11 show light intensity distribution at the positions Q1 to Q11, respectively. As illustrated in (a) of FIG. 2, X-axis and Y-axis being orthogonal coordinate are assumed here. In such a coordinate system, the light incident to the input waveguide 2 is propagated in a direction of Z-axis orthogonal to both X-axis and Y-axis (in a direction where the input waveguide 2 extends).

Further, (b) of FIG. 2 shows shapes of the light intensity distribution E1 to E10 at the positions Q1 to Q10 in (a) of FIG. 2, respectively. Here, the "beam shape in X-Y plane" refers to the shape of the intensity distribution of the light (electric field) viewed on the X-Y plane (it is typically in the form of a contour map, but contour lines are omitted in (b) of FIG. 2). On the other hand, the "beam intensity distribution in line X—X" refers to the light intensity distribution of when a cross section taken along the line X—X of the "beam shape on the X-Y plane" is viewed from the bottom side, for example (since the intensity is highest at the center, the intensity distribution has a shape of chevron as illustrated in the figure).

As illustrated in (a) and (b) of FIG. 2, both of the light intensity distribution E1 at the position Q1 on the input waveguide 2 and the light intensity distribution E2 at the boundary position Q2 between the input waveguide 2 and the input slab 3 have a sharp and high distribution shape having narrow width. In the input slab 3, since the light is propagated while extending by diffraction, as the light travels through Q3 to Q4, . . . , and Q10, the width of the light intensity is extended and the shape of the light intensity distribution is changed as illustrated in E3, E4, . . . , and E10, respectively. Then, the light that has been propagated through the input slab 3 reaches the interface 302 with the channel waveguides 4 to be optically coupled to the channel waveguides 4.

At this time, as the similarity of the distribution shape between the intensity distribution E10 of the light that extended while being propagated through the input slab 3 and the intensity distribution E11 of the light that is excited by the channel waveguides 4 is increased, higher coupling efficiency is obtained (Here, it is to be noted that (a) of FIG. 2 shows the intensity distribution corresponding to one of the channel waveguides 4).

Figure 3:
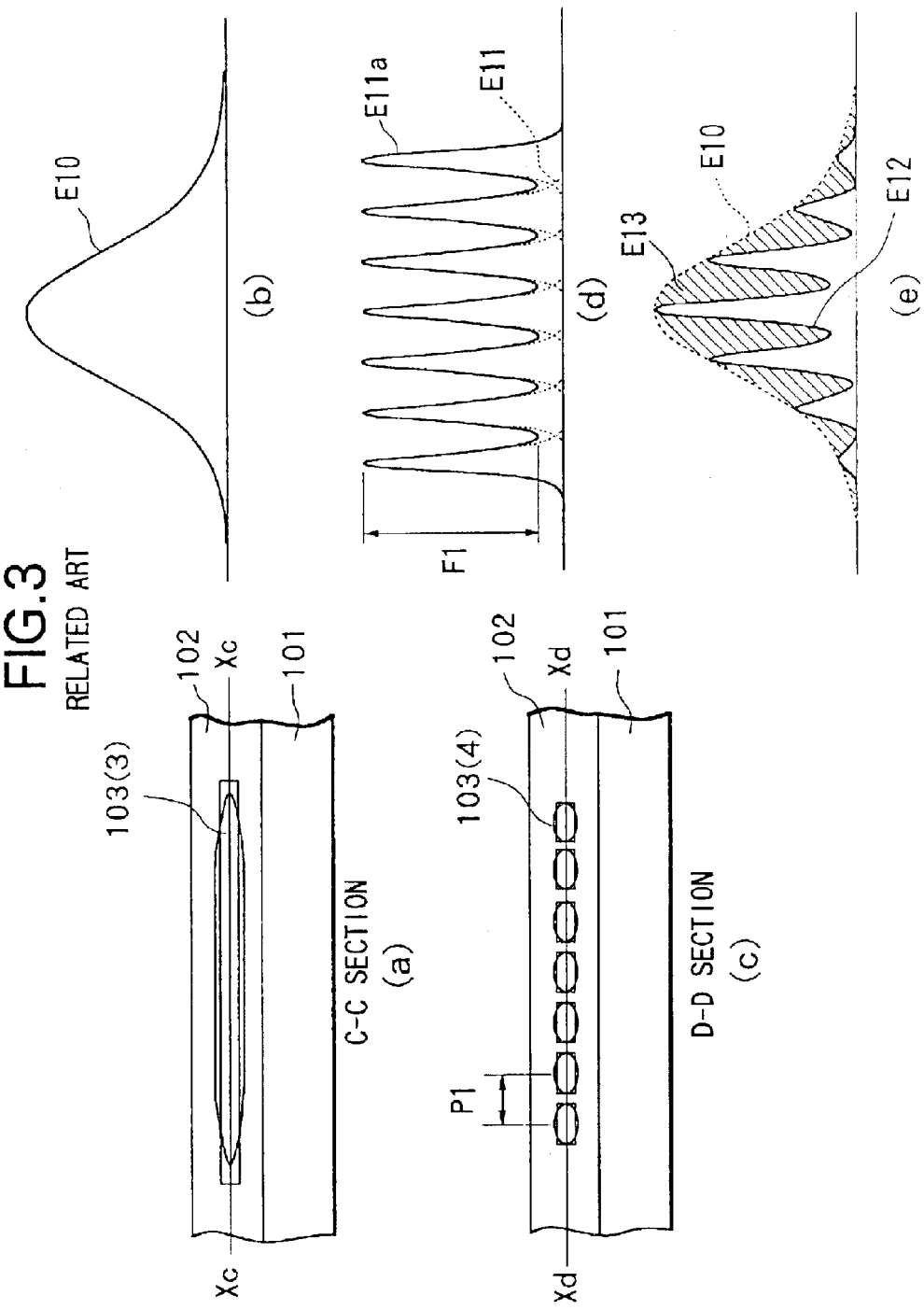
FIG. 3 is a diagram for qualitatively explaining a factor responsible for a loss of the light that is propagated through the input slab to be coupled to the channel waveguides in the conventional wavelength multiplexing/demultiplexing apparatus.

FIG. 3 are diagrams for qualitatively explaining a factor responsible for a loss of the light that is propagated through the input slab 3 to be coupled to the channel waveguides 4 in the conventional wavelength multiplexing/demultiplexing apparatus shown in FIG. 10. Note, (a) of FIG. 3 is a cross sectional view taken along line C—C in (a) of FIG. 10, (b) of FIG. 3 is a diagram illustrating the light intensity distribution taken on line Xc—Xc in (a) of FIG. 3, (c) of FIG. 3 is a cross sectional view taken along line D—D in (a) of FIG. 10, and (d) of FIG. 3 is a diagram illustrating the intensity distribution taken on line Xd—Xd in (c) of FIG. 3. Note, the light intensity distribution E10 in (b) of FIG. 3 is equal to the light intensity distribution E10 in FIG. 2, and the light intensity distribution E11 in (d) of FIG. 3 is equal to the light intensity distribution E11 in FIG. 2.

In (d) of FIG. 3, a curve E11a is light intensity distribution formed when the light intensity distribution E11 excited by the plurality of channel waveguides 4 is overlapped with each other. Here, F1 is a height difference between peak and valley of the overlapped light intensity distribution E11a. The light coupled to the channel waveguides 4 from the input slab 3, receives power corresponding to the portion overlapped with the light intensity distribution E11a of the channel waveguides 4 shown in (d) of FIG. 3, in the light intensity distribution E10 in the input slab 3 shown in (b) of FIG. 3.

(e) of FIG. 3 qualitatively shows an overlap of the light intensity distribution E10 in the input slab 3 and the light intensity distribution E12 in the channel waveguides 4, in which an outlined area E12 represents a portion where the light is optically coupled to the channel waveguides 4 by overlapping, and a shaded area E13 represents a portion where the light is not optically coupled to the channel waveguides 4, to be lost. As shown in (e) of FIG. 3, in order to reduce a coupling loss between the input slab 3 and the channel waveguides 4, it is necessary to reduce the area of E13 where the coupling loss occurs.

Thus, in this embodiment, the radius r1 of the input slab 3 is set to be smaller than the radius r2 of the output slab 5, and the core spacing P1 between the channel waveguides 4 at the input slab 3 side is set to be narrower than the core spacing P2 between the channel waveguides 4 at the output slab 5 side, so that the area of the loss portion E13 can be reduced due to a function as described in detail later.

Figure 4:
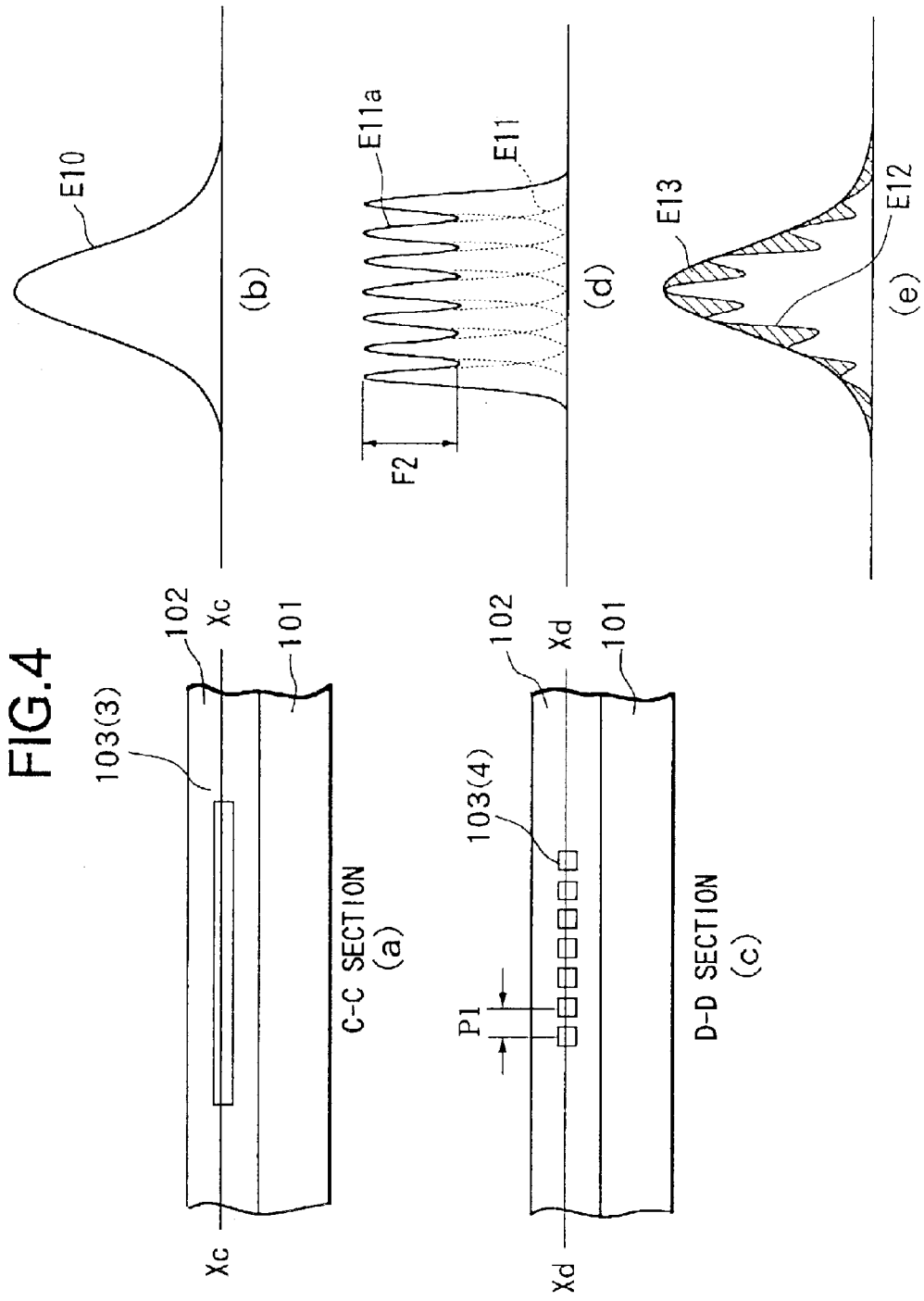
FIG. 4 are diagrams showing light intensity distribution and coupling conditions of an input slab and channel waveguides in the first embodiment, in which (a) is a cross sectional view taken along line C—C in (a) of FIG. 1, (b) shows the light intensity distribution taken on line Xc—Xc in (a), (c) is a cross sectional view taken on line D—D in (a) of FIG. 1, (d) shows the light intensity distribution taken on line Xd—Xd in (c), and (e) is a diagram in which each light intensity distribution of the input slab and the channel waveguides are overlapped with each other.

FIG. 4 are diagrams showing the light intensity distribution and coupling condition of the input slab 3 and the channel waveguides 4 in this embodiment. Note, (a) of FIG. 4 is a cross sectional view taken along line C—C in (a) of FIG. 1, (b) of FIG. 4 shows the light intensity distribution taken on line Xc—Xc in (a) of FIG. 4, (c) of FIG. 4 is a cross sectional view taken along line D—D in (a) of FIG. 1, and (d) of FIG. 4 shows the light intensity distribution taken on line Xd—Xd in (c) of FIG. 4. Further, a curve E11a represents the light intensity distribution formed when the light intensity distribution E11 excited by each of the plurality of channel waveguides 4 is overlapped with each other.

In this embodiment, since the core spacing P1 between channel waveguides 4 is made to be narrower as shown in (c) of FIG. 4 (see the core spacing in the conventional case shown in (c) of FIG. 3) so that a ratio of component distributed at the outside of the core 103 in the light intensity distribution E11 is increased, the overlapped portion of the light intensity distribution E11 corresponding to each of the channel waveguides 4 is increased as shown in (d) of FIG. 4. Note, in the example in (c) of FIG. 4, the overlapped portion is further increased by narrowing the core width of channel waveguides 4.

As a result, a difference F2 between peak and valley of the combined light intensity distribution E11a becomes smaller than the difference F1 shown in (d) of FIG. 3, and unevenness of the light intensity distribution E11a is reduced in comparison with the conventional case. Therefore, as shown in (e) of FIG. 4, the area of the portion E13 corresponding to the lost component after the light intensity distribution E10 in the input slab 3 and the light intensity distribution E11a in the channel waveguides 4 are overlapped with each other is reduced, and consequently, the coupling loss between the input slab 3 and the channel waveguides 4 can be reduced.

Here, a relationship between the core width of the channel waveguides 4 and the intensity distribution of the light propagated through the core will be described.

FIG. 5 is a diagram showing the relationship of the intensity distribution of the light propagated through the core to the core width w. Note, a fragmentary view (a) in this figure shows one of the cores constituting the channel waveguides of the cross section taken along line D—D in (a) of FIG. 1, and a curve (b) in a graph represents width $\omega$ of the intensity distribution of the light propagated through the core, and a straight line (c) represents a relationship between the core width w and the width $\omega$ of the light intensity distribution on the assumption that the width w is equal to the width $\omega$ (although it is not true actually). Here, the width w of the light intensity distribution is width (total width) where the intensity of the light (electric field) takes a value of 1/e (e is natural logarithm) of a peak value. Further, E in the fragmentary view (a) represents the light (electric field) intensity distribution, a hollow circle w10 on the curve (b) in the graph represents a point corresponding to the core width of the channel waveguides 4 of the wavelength multiplexing/demultiplexing apparatus according to this embodiment, and a hollow circle w20 represents a point corresponding to the core width of the channel waveguides 4 of the conventional wavelength multiplexing/demultiplexing apparatus.

As shown in FIG. 5, in the case where the core width w is narrowed from w20 to w10, it can be seen that a reduction rate of the width (spot size) $\omega$ of the light intensity distribution becomes smaller than a reduction rate of the core width w. That is, as the core width w is narrowed, the component of the light intensity distribution, that is located at the outside of the core, is increased. Therefore, as illustrated in (d) of FIG. 4, the overlapped portion of the light intensity distribution is increased and the unevenness of the light intensity distribution E11a is reduced. As a result, the optical coupling loss between the input slab 3 and the channel waveguides 4 can be reduced.

Figure 6:
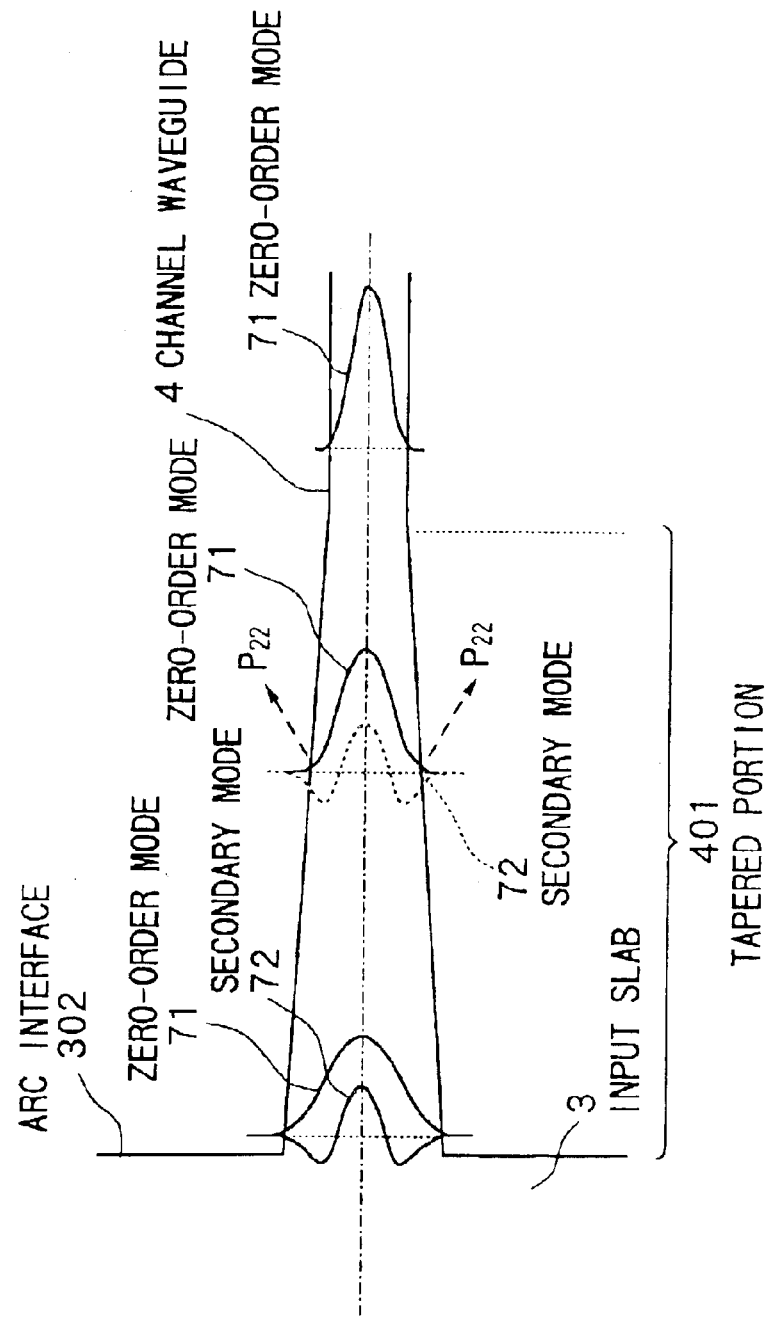
FIG. 6 is a diagram illustrating higher modes excited by a tapered portion and propagation conditions thereof in the conventional wavelength multiplexing/demultiplexing apparatus.

Further, in the wavelength multiplexing/demultiplexing apparatus according to this embodiment, there can be achieved an effect in that a loss due to higher mode radiation is reduced. That is, in the conventional wavelength multiplexing/demultiplexing apparatus as shown in FIG. 10, when the light is incident to the tapered portion 401 of each channel waveguide 4 from the input slab 3, the higher mode is excited at a wide portion in the tapered portion as shown in FIG. 6, for example. More specifically, when the light having propagated through the input slab 3 is incident to each channel waveguide 4 from a direction where the opening of the tapered portion is extended, a zero-order mode 71 having the light intensity distribution with one peak and a secondary mode 72 having the light intensity distribution with two peaks are induced to be propagated through the channel waveguide 4. However, as the light advances to the right in FIG. 6 and the core width is narrowed, since the channel waveguide cannot propagates the secondary mode 72, power P22 of the secondary mode 72 is radiated to the outside of the core, and such a component is resulted in a loss.

On the other hand, in the wavelength multiplexing/demultiplexing apparatus according to this embodiment shown in FIG. 1, since the core width is uniform and narrow at inlet portions (the portions that are connected to the input slab 3) of the channel waveguides 4, the secondary mode 72 as described above is never excited. Therefore, the loss due to the higher mode radiation can be avoided and the loss in the channel waveguides 4 at the input slab 3 side can be reduced.

Specifically, for example, in the wavelength multiplexing/demultiplexing apparatus 1A according to this embodiment designed such that the radius r1 of the input slab 3 is 20 mm, the spacing P1 between the channel waveguides 4 at the input slab 3 side is 10 μm, the radius r2 of the output slab 5 is 40 mm, and the spacing P2 between the channel waveguides 4 at the output slab 5 side is 20 μm, it is confirmed that an insertion loss is 4.8 dB, for example. On the other hand, in the conventional wavelength multiplexing/demultiplexing apparatus designed such that the radius r1 of the input slab 3 is 40 mm, the spacing P1 between the channel waveguides 4 at the input slab 3 side is 20 μm, and other designing parameters are same as those of this embodiment, the insertion loss is 5.4 dB. In this case, the wavelength multiplexing/demultiplexing apparatus according to this embodiment achieves a loss reduction effect of 0.6 dB in comparison with the conventional configuration.

Next, a second embodiment of the present invention will be described.

Figure 7:
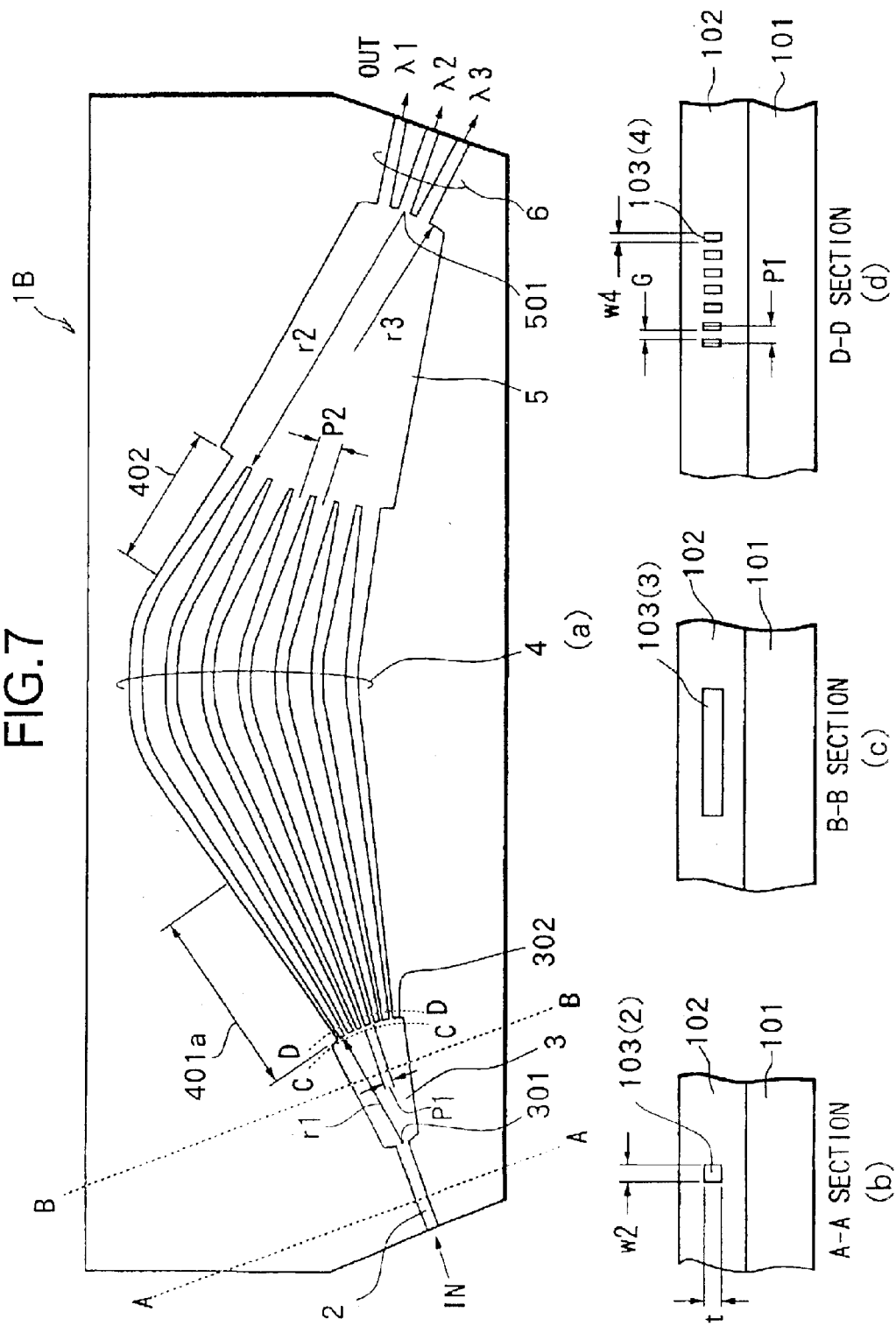
FIG. 7 are diagrams showing a constitution of a wavelength multiplexing/demultiplexing apparatus according to a second embodiment of the present invention, in which (a) is a plan view, and (b), (c) and (d) are cross sectional views taken along lines A—A, B—B and D—D in the plan view, respectively.

FIG. 7 are diagrams showing a constitution of a wavelength multiplexing/demultiplexing apparatus according to the second embodiment. Note, (a) of FIG. 7 is a plan view, and (b), (c) and (d) of FIG. 7 are cross sectional views taken along lines A—A, B—B and D—D in the plan view, respectively. Further, components same as those in the first embodiment are designated by same reference numerals and the description thereof is omitted, and such reference numerals are also applied to other embodiments.

In (a) to (d) of FIG. 7, a constitution of a wavelength multiplexing/demultiplexing apparatus 1B differs from the constitution of the first embodiment shown in (a) to (d) of FIG. 1 in that tapered portions 401a, each of which has core width w4 that is made to be narrowed towards the input slab 3, are formed in the channel waveguides 4 in the vicinity of the connection portion to the input slab 3, and the radius r1 of the input slab 3 is further reduced. As shown in the cross sectional view in (d) of FIG. 7, since the core width w4 of each channel waveguide 4 is made to be narrowed, the spacing P1 between the cores is also reduced. Note, the gaps G are constituted similarly to the conventional constitution or the constitution of the first embodiment.

In the input slab 3, the radius r1 of the circular arc interface 302 at the connection portion to the channel waveguides 4 is 10 mm, for example. Further, in each channel waveguide 4, the spacing P1 between the cores that are connected to the input slab 3 is 5 μm, the core width w4 is 2 μm and the length of gap G is 3 μm, and further, the length of each tapered portion 401a positioned at the input slab 3 side is 1 mm.

Note, the core spacing P2 between the channel waveguides 4 that are connected to the output slab 5 and the radius r2 of the output slab 5 are P2=20 μm and r2=40 mm, respectively, just as in the first embodiment. Further, the relative refractive index difference between the core 103 and the cladding 102 of the optical waveguide and the thickness t of the core 103 are also same as those in the first embodiment. Further, the core width of the input waveguide 2, the output waveguides 5, and the channel waveguides 4 except the tapered portions 401 and 402 is 7 μm, just as in the first embodiment.

In the wavelength multiplexing/demultiplexing apparatus 1B with the constitution as described above, the width w4 of the channel waveguides 4 that are connected to the input slab 3 corresponds to the core width w30 in the relationship between the core width ω of the optical waveguide and the width ω of the intensity distribution of the light propagated through the core, illustrated in FIG. 5 above. At this time, the width ω of the light intensity distribution is extended two or three times wider than the core width w4. Therefore, the overlapped portion of the light intensity distribution E11 excited by each of the channel waveguides 4 is significantly increased in comparison with the case of the first embodiment.

Figure 8:
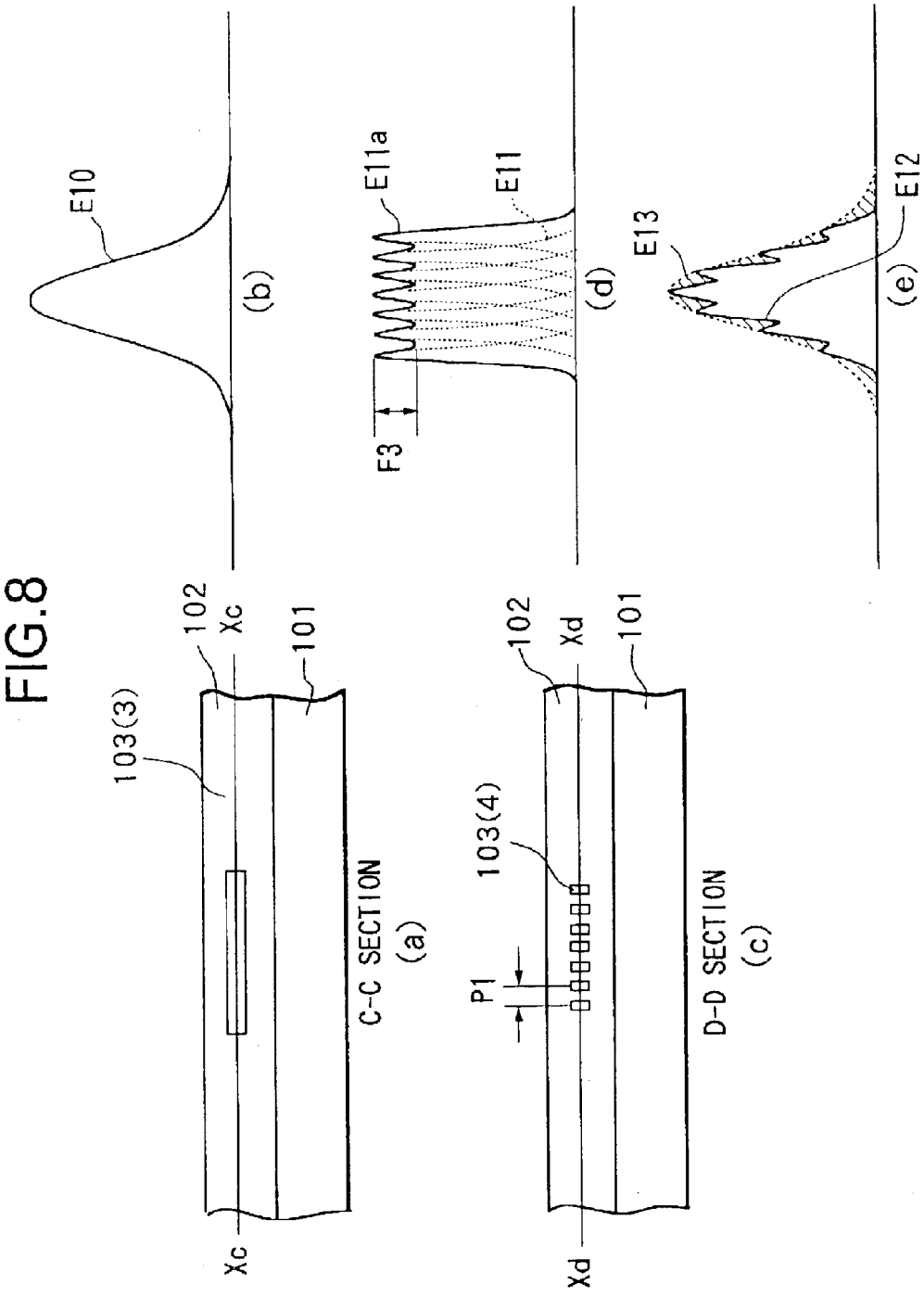
FIG. 8 are diagrams showing light intensity distribution and coupling conditions of an input slab and channel waveguides in the second embodiment, in which (a) is a cross sectional view taken along line C—C in (a) of FIG. 7, (b) shows the light intensity distribution taken on line Xc—Xc in (a), (c) is a cross sectional view taken on line D—D in (a) of FIG. 7, (d) shows the light intensity distribution taken on line Xd—Xd in (c), and (e) is a diagram in which each light intensity distribution of the input slab and the channel waveguides are overlapped with each other.

FIG. 8 are diagrams showing the light intensity distribution and coupling condition of the input slab 3 and channel waveguides 4 in the second embodiment. Note, (a) of FIG. 8 is a cross sectional view taken along line C—C in (a) of FIG. 7, (b) of FIG. 8 shows the light intensity distribution taken on line Xc—Xc in (a) of FIG. 8, (c) of FIG. 8 is a cross sectional view taken along line D—D in (a) of FIG. 7, (d) of FIG. 8 shows the light intensity distribution taken on line Xd—Xd in (c) of FIG. 8, and (e) of FIG. 8 is a diagram in which each light intensity distribution of the input slab and the channel waveguides 4 is overlapped with each other.

As shown in (c) of FIG. 8, in this embodiment, it can be seen that the overlapped portion of the light intensity distribution E11 excited by each of the channel waveguides 4 is significantly increased in comparison with the case of the first embodiment shown in (c) of FIG. 4. This is because the core width w4 and the core spacing P1 of each of the channel waveguides 4 are reduced. The ratio of component that is distributed at the outside of the core 103 in the light intensity distribution E11 is increased, and the overlapped portion of the light intensity distribution E11 between the adjacent channel waveguides 4 is also increased. Therefore, a difference F3 between peak and valley of the light intensity distribution E11a that is a combination of each light intensity distribution E11 is reduced and thus unevenness of the light intensity distribution E11a is further reduced in comparison with the first embodiment shown in (c) of FIG. 4. As a result, as shown in (e) of FIG. 8, the area of loss component E13 after overlapping is further reduced, to achieve an effect to further reduce the optical coupling loss between the input slab 3 and the channel waveguides 4.

Specifically, for example, it is confirmed that the insertion loss of the wavelength multiplexing/demultiplexing apparatus 1B according to this embodiment is 3.9 dB. In this case, the wavelength multiplexing/demultiplexing apparatus 1B according to this embodiment achieves a loss reduction effect of 1.5 dB in comparison with the insertion loss of 5.4 dB in the conventional wavelength multiplexing/demultiplexing apparatus described above, and has a loss reduction effect of 0.9 dB in comparison with the insertion loss of 4.8 dB in the wavelength multiplexing/demultiplexing apparatus 1A according to the first embodiment.

Next, a third embodiment of the present invention will be described.

In the wavelength multiplexing/demultiplexing apparatus 1B according to the second embodiment described above, in the tapered portion 401a, the width of the intensity distribution of the light propagated through the waveguide needs to be changed corresponding to a change in the core width. However, if the core width is changed abruptly, the change in the width of the intensity distribution is unable to follow the change in the core width and there is a possibility that a desired propagation characteristic cannot be obtained. In order to avoid such a problem, it is desired that the length of the tapered portion 401a is about 1 mm. But, as the length of the tapered portion 401a is increased, there is caused a problem in that the overall size of the wavelength multiplexing/demultiplexing apparatus is increased. Therefore, in this third embodiment, an application example to reduce the length of the tapered portion 401a is considered.

Figure 9:
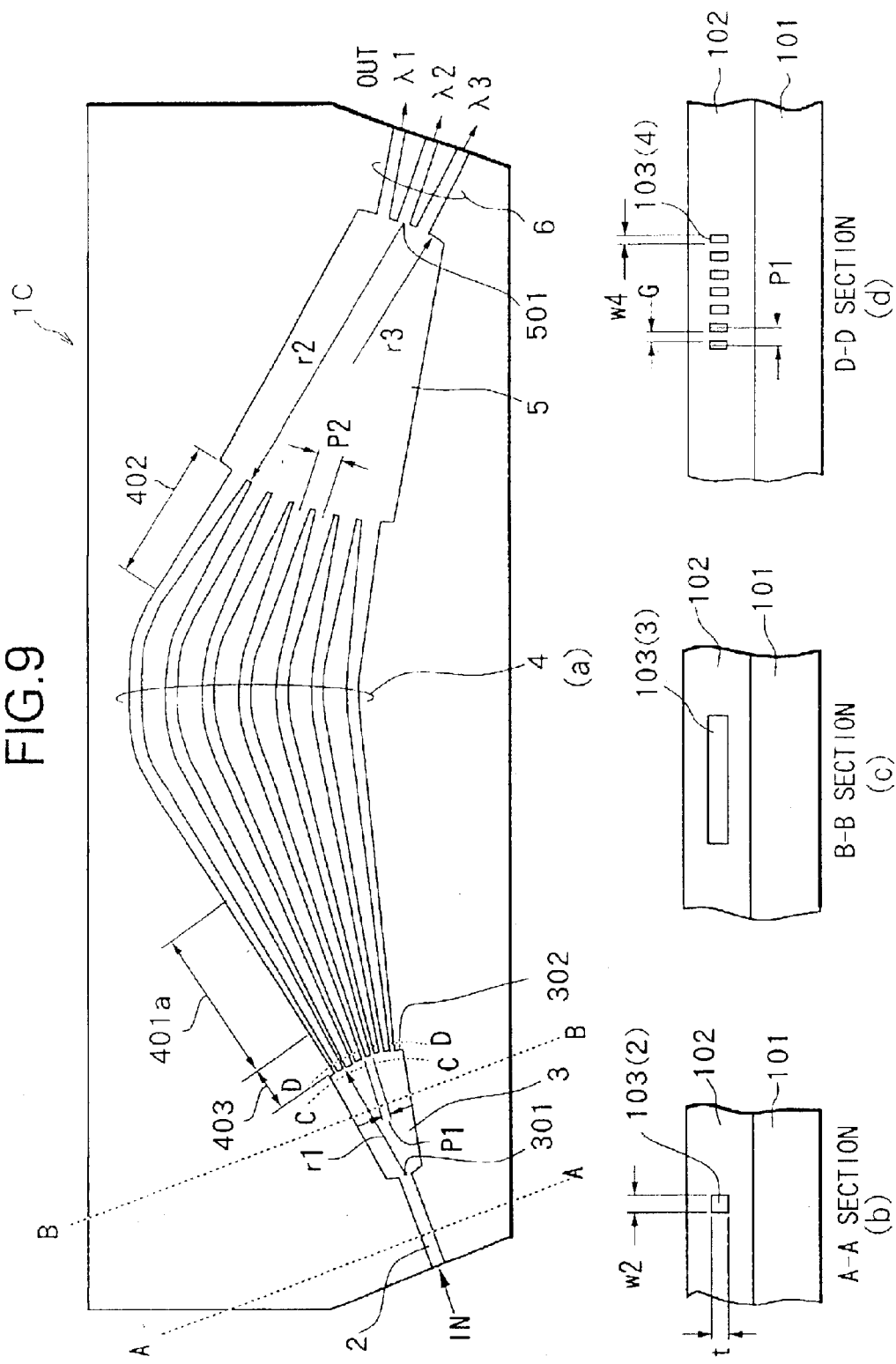
FIG. 9 are diagrams showing a constitution of a wavelength multiplexing/demultiplexing apparatus according to a third embodiment of the present invention, in which (a) is a plan view, and (b), (c) and (d) are cross sectional views taken along lines A—A, B—B and D—D in the plan view, respectively.

FIG. 9 are diagrams showing a constitution of the wavelength multiplexing/demultiplexing apparatus according to the third embodiment. Note, (a) of FIG. 9 is a plan view, and (b), (c) and (d) of FIG. 9 are cross sectional views taken along lines A—A, B—B and D—D in the plan view, respectively.

In (a) to (d) of FIG. 9, a constitution of a wavelength multiplexing/demultiplexing apparatus 1C differs from the constitution of the second embodiment as shown in (a) to (d) of FIG. 7 in that a constant-width portion 403 having constant core width that is equal to the narrowest core width of the tapered portion 401a is formed in each of the channel waveguides 4 in the vicinity of the connection portion to the input slab 3. Specifically, in this wavelength multiplexing/demultiplexing apparatus 1C, the length of the constant-width portion 403 is 0.1 mm, for example, and the length of the tapered portion 401a connected to the constant-width portion 403 is 0.5 mm, for example. Note, other design values such as the radiuses r1 and r2 of the input slab 2 and the output slab, and the core spacing P1 and P2 at the input and output sides of the channel waveguide, are same as those in the second embodiment.

In the wavelength multiplexing/demultiplexing apparatus 1C with the constitution as described above, since the constant-width portion 403 is provided in each channel waveguide 4 connected to the input slab 3, the length of the tapered portion 401a can be reduced. In this embodiment, by providing the constant-width portion 403 having the length of 0.1 mm, the length of the tapered portion 401a can be reduced to 0.4 mm. This is because, even if the width of the intensity distribution of the light propagated through the waveguide is unable to follow the change in the core width of the tapered portion 401a, when the propagation light passes through the constant-width portion 403, the width of the intensity distribution of the propagation light is converged to the width of the light intensity distribution in the constant-width portion 403. Thus, since the length of the tapered portion 401a can be reduced, it becomes possible to reduce the overall size of the wavelength multiplexing/demultiplexing apparatus in comparison with the second embodiment.

As described above, by providing the constant-width portion 403 in each channel waveguide 4, even in the case where the length of the tapered portion 401 is reduced to 0.5 mm, it has been confirmed that the insertion loss is 3.9 dB, for example. Accordingly, according to this wavelength multiplexing/demultiplexing apparatus, it is possible to achieve the loss reduction effect the same as that in the second embodiment.

In each of the first to three embodiments, the description has been made by indicating the specific design values of each portions of the wavelength multiplexing/demultiplexing apparatus. However, such values are illustrative only and the present invention is not limited to the above specific values.

What is claimed is:

1. A wavelength multiplexing/demultiplexing apparatus comprising on a substrate: at least one input waveguide that is input with an optical signal at one end thereof; an input slab that is connected with the other end of said input waveguide at an input side interface thereof, and propagates freely the optical signal from said input waveguide in a plane direction of said substrate to an output side circular arc interface thereof; a plurality of channel waveguides that are connected to the output side circular arc interface of said input slab at one ends thereof, and have waveguide lengths different from each other; an output slab that is connected with the other end of each of said channel waveguides at an input side circular arc interface thereof and propagates freely the optical signal from each of said channel waveguides in the plane direction of said substrate to an output side interface thereof; and a plurality of output waveguides that are connected to the output side interface of said output slab at one ends thereof, wherein a curvature radius of the output side circular arc interface of said input slab is smaller than a curvature radius of the input side circular arc interface of said output slab, and further, spacing between said channel waveguides at a portion where said input slab and said channel waveguides are connected with each other is narrower than spacing between said channel waveguides at a portion where said channel waveguides and said output slab are connected with each other.

2. A wavelength multiplexing/demultiplexing apparatus according to claim 1, wherein said each channel waveguide includes, in the vicinity of the connection portion to said input slab, a tapered portion formed so that the width of said channel waveguide becomes narrower in a direction of said input slab.

3. A wavelength multiplexing/demultiplexing apparatus according to claim 2, wherein said each channel waveguides includes a constant-width portion comprising a waveguide having the constant width equal to the narrowest width portion of said channel waveguide in said tapered portion and said tapered portion is connected to said input slab via said constant-width portion.

4. A wavelength multiplexing/demultiplexing apparatus according to claim 1, wherein said input slab and said output slab are analogous to each other.

5. A wavelength multiplexing/demultiplexing apparatus according to claim 1, wherein, in each of said channel waveguides, the width of said channel waveguide at the connection portion to said input slab is smaller than the width of said channel waveguide at the connection portion to said output slab.

6. A wavelength multiplexing/demultiplexing apparatus according to claim 1, wherein said each channel waveguide further includes, in the vicinity of the connection portion to said output slab, a tapered portion formed so that the width of said channel waveguide becomes wider in a direction of said output slab.

7. A wavelength multiplexing/demultiplexing apparatus according to claim 1, wherein the output side interface of said output slab is positioned on a circular arc corresponding to a Rowland circle of the input side circular arc interface.

* * * * *